United States Patent [19]
Kronberg

[11] Patent Number: 5,189,359
[45] Date of Patent: Feb. 23, 1993

[54] SOLID STATE SAFETY JUMPER CABLES

[76] Inventor: James W. Kronberg, 353 Church Rd., Beech Island, S.C. 29841

[21] Appl. No.: 643,317

[22] Filed: Jan. 22, 1991

[51] Int. Cl.$^5$ .................................................. H02J 7/00
[52] U.S. Cl. .......................................... 320/26; 320/25
[58] Field of Search ..................................... 320/25, 26

[56] References Cited
U.S. PATENT DOCUMENTS

| | | | |
|---|---|---|---|
| 4,420,786 | 12/1983 | Toney | 361/77 |
| 4,423,456 | 12/1983 | Zaidenweber | 361/77 |
| 4,740,740 | 4/1988 | Taranto et al. | 320/26 |
| 4,769,586 | 9/1988 | Kazmierowicz | 320/26 |
| 4,871,957 | 10/1989 | Taranto et al. | 320/26 |

Primary Examiner—R. J. Hickey
Attorney, Agent, or Firm—Harold M. Dixon; William R. Moser; Richard E. Constant

[57] ABSTRACT

Solid state jumper cables for connecting two batteries in parallel, having two bridge rectifiers for developing a reference voltage, a four-input decoder for determining which terminals are to be connected based on a comparison of the voltage at each of the four terminals to the reference voltage, and a pair of relays for effecting the correct connection depending on the determination of the decoder. No connection will be made unless only one terminal of each battery has a higher voltage than the reference voltage, indicating "positive" terminals, and one has a lower voltage than the reference voltage, indicating "negative" terminals, and that, therefore, the two high voltage terminals may be connected and the two lower voltage terminals may be connected. Current flows once the appropriate relay device is closed. The relay device is preferably a MOSFET (metal oxide semiconductor field effect transistor) combined with a series array of photodiodes that develop MOSFET gate-closing potential when the decoder output causes an LED to light.

4 Claims, 1 Drawing Sheet

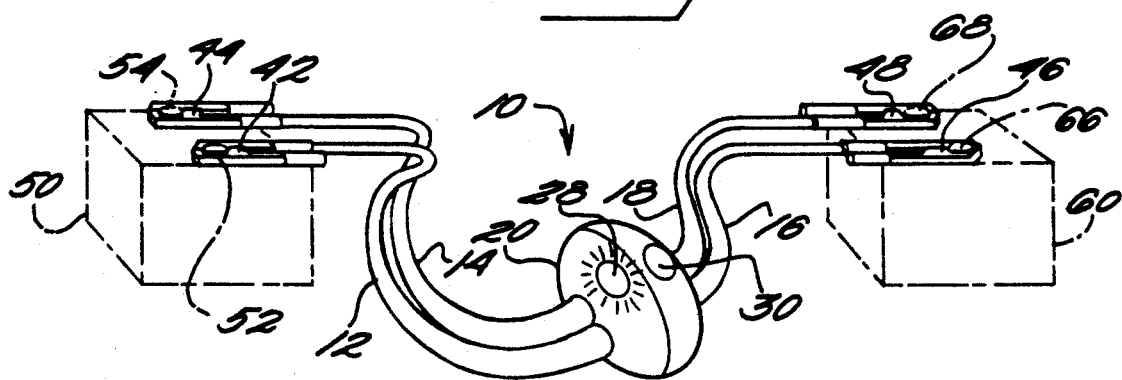
Fig. 1.
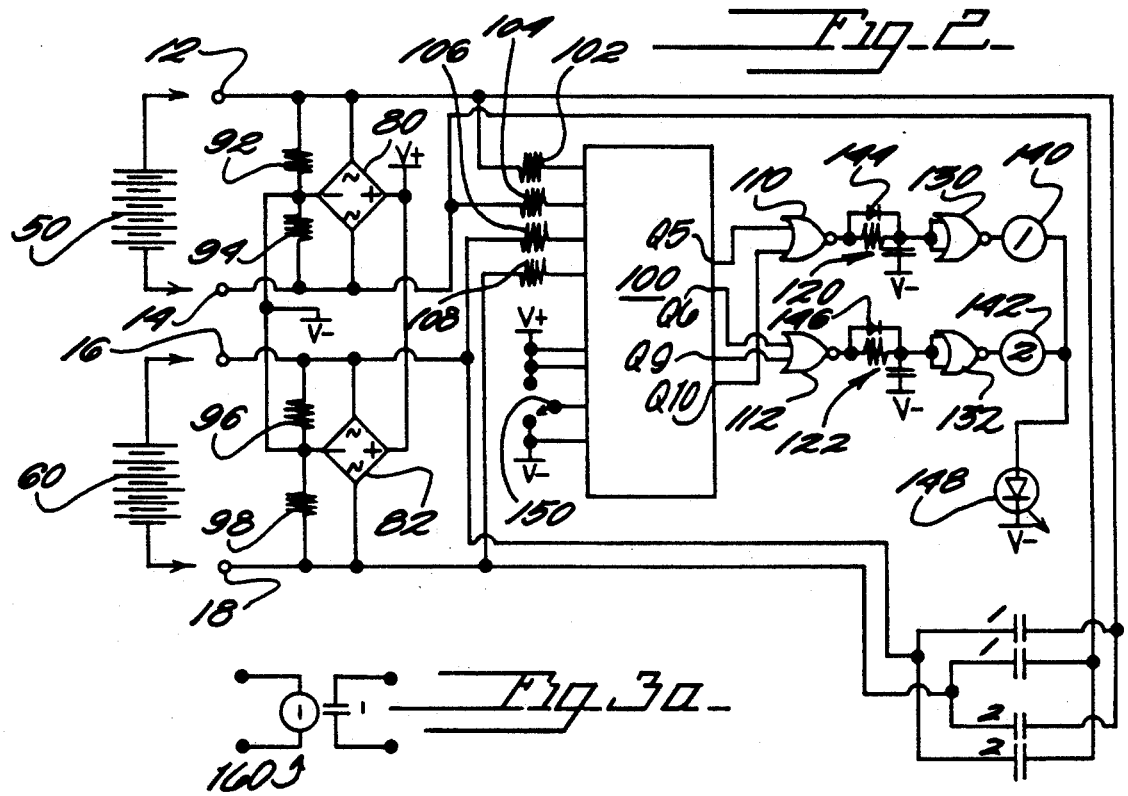
Fig. 2.
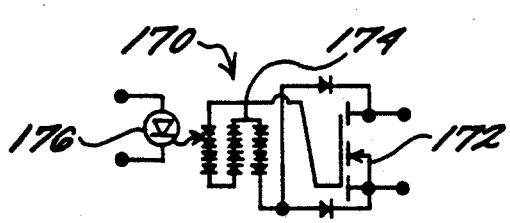
Fig. 3a.
Fig. 3b.
Fig. 3c.

SOLID STATE SAFETY JUMPER CABLES

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates generally to cables for use in charging one automobile battery with another automobile battery.

2. Discussion of Background

Battery jumper cables generally comprise a pair of electrical connectors with clamps at opposing ends for securing to the terminals of a battery, one charging battery and one "dead" battery, or battery to be charged. The batteries must be connected in parallel to charge one from to the other. The tops of the batteries are typically marked with a "+" for positive and with a "−" for negative and usually the negative terminal is connected to ground. Furthermore, the cables are often color coded to help the user hook them up in proper relationship and sequence. However, if the top of the battery is dirty or the ambient lighting dim, it may be difficult to distinguish the terminals and determine which cable goes to which terminal. Furthermore, individuals tend to forget the proper cable connection sequence. Finally, there is sometimes the possibility when hooking the cables up to a "live" battery that hydrogen or other flammable gas, given off from the chemical activity in the battery, can be ignited by a spark and cause an explosion or fire in the engine compartment of the car.

To reduce the difficulty of connecting battery terminals during jump starting and the possibility of connecting the cables to the terminals improperly, several devices have been designed. See for example, U.S. Pat. No. 4,871,957 issued Oct. 1989 to Taranto, et al., U.S. Pat. No. 4,769,586 issued Sep. 1988 to Kazmierowicz, and U.S. Pat. No. 4,527,111 issued to Branham Jul. 1985. Branham uses electro-mechanical relays for correcting polarity without requiring reversal of one pair of cables. Taranto, et al. uses specialized clamps on the battery cables and repeated sampling of the voltages on the battery terminals to determine polarity. Kazmierowicz uses two sensing circuits, a switching circuit, and digital logic to assign cables according to correct polarity.

However, none of these systems is sufficiently durable, simple in design or inexpensive to manufacture.

SUMMARY OF THE INVENTION

According to its major aspects, the present invention is a device for use in connecting in parallel two batteries, each having two terminals. After connection of two pair of cables to the four terminals, one pair of cables to each battery, and preferably after a button is pushed to activate the device, the voltages of each of the four terminals are compared to a reference voltage to determine which of the terminals, if any, are at voltages higher than the reference voltage and which, if any, are at lower voltages. The device produces internally a first signal, such as a logic "1", for those that are higher and a second signal, such as a logic "0", for those that are lower than the reference voltage. The four signals form a combination or set, one of sixteen theoretically possible sets of four high or low signals. Four of these sets correspond to appropriate parallel configurations: each set having two first signals, one from each battery, and two second signals, again one from each battery. The remaining twelve sets correspond to impossible or incorrect configurations or batteries missing or shorted. The device will address these sets, using preferably a four-input decoder, so that the four appropriate sets produce outputs that activate relays, after a short, confirming delay, to allow current to flow between the batteries through the cables. In a preferred embodiment, the fact of the charging of the low battery is confirmed to the user by a light on the device.

To produce the reference voltage, which is lower than the highest voltage of any of the four terminals and higher than the lowest voltage of any of the four terminals, two bridge rectifiers receive the voltages of the four terminals, one rectifier connected to the first battery and the other to the second battery. The two rectifiers are interconnected so that the high voltage outputs are tied together and the low voltage output are tied together. The reference voltage is set approximately halfway between the high and the low outputs of the bridge rectifiers.

The device preferably uses solid state relays composed of MOSFETs (metal-oxide-semiconductor field-effect transistors) combined with arrays of photodiodes activated by LEDs (light emitting diodes) for causing power to flow between the batteries once the correct assignment of polarity has been made. However, conventional electromagnetic relays may optionally be substituted.

It is a feature of the present invention that it uses a four-input decoder to assign addresses to the sixteen possible sets of signals from the four terminals and to produce an output for only those four addresses that correspond to conditions of the two batteries where battery charging can be done. The advantage of this feature is simplicity in manufacture since such decoders are small, reliable, readily available and simple to connect to other components.

It is another feature of the present invention that it uses, in the preferred embodiment, optically coupled relays rather than mechanical relays. This type of relay has the advantages of electro-mechanical relays—total isolation between controlled and controlling circuits and full bidirectionality—while lacking the disadvantages of such relays: bulk, weight, moving parts, coil inductance, high drive requirements, slow response, vulnerability (to contact burnout, welding, arcing and contamination), and potential to ignite hydrogen or other flammable gases.

It is still another feature of the present invention that it does not close the relays immediately but, through an RC (resistor capacitor) circuit, requires the output of the decoder to be constant for a short period of time. The advantage of this feature is that, by addition of a simple circuit feature, a potential source of error—spurious outputs—will not result in the improper connection of the terminals.

Other features and advantages of the present invention will be apparent to those skilled in the art of jumper cables from a careful reading of the Detailed Description of a Preferred Embodiment accompanied by the drawings briefly described below.

BRIEF DESCRIPTION OF THE DRAWINGS

In the figures,

FIG. 1 is a perspective view of jumper cables according to a preferred embodiment of the present invention;

FIG. 2 is a schematic of the circuitry of jumper cables according to a preferred embodiment of the present invention;

FIGS. 3a, 3b, and 3c illustrate alternative embodiments of details of the relays of the present invention, including a generalized relay, a solid state relay, and a conventional electro-mechanical relay.

DETAILED DESCRIPTION OF A PREFERRED EMBODIMENT

Referring now to FIG. 1, the jumper cable set, indicated generally by reference character 10, comprises two pair of heavy, flexible electrical conductors, or cables, indicated by reference characters 12 and 14 for one pair and 16 and 18 for the other pair, extending from a central box, bulge, or module 20 to which cables 12, 14, 16, 18 are connected and which contains solid state electronics, to be described more fully below. Cables 12 and 14 and cables 16 and 18 are preferably fastened together for a portion of their length to reduce the likelihood that cables not belonging to the same pair will be connected to the same battery. The module may be optionally equipped with a lamp, LED or other light emitting means 28 for signalling that the circuit is in operation. Also, and again optionally, module may be equipped with a switch 30 permitting the charging function to be disabled manually: for example, to prevent sparking on disconnection. Cables 12, 14, 16, 18 each has a clamp 42, 44, 46, 48, respectively, attached at the remote end thereof for convenience in removably connecting each cable to automotive batteries. Cables 12 and 14 are connected to terminals 52 and 54, respectively, of battery 50 and cables 16 and 18 are connected to terminals 66 and 68, respectively, of battery 60. Batteries 50 and 60 are not part of the present invention.

FIG. 2 is a schematic diagram of the present invention according to a preferred embodiment. Cables 12, 14 and 16, 18 are connected respectively to battery 50 and Battery 60, as in FIG. 1. Two bridge rectifiers 80, 82, or alternatively, an array of discrete rectifiers, select voltages V+ and V− such that V+ is approximately 0.7 volts less than the highest of voltages on cables 12, 14, 16 and 18, and V− is approximately 0.7 volts above the lowest of these voltages. The presence of a battery connected either at 12, 14, or at 16, 18, or both, and capable of supplying at least 4.5 volts, is sufficient to start operation of the jumper cable set 10. Use with batteries or other power sources supplying more than 18 volts is not recommended, as these voltages could damage certain circuit elements of the device. However, it will be apparent to those skilled in the art that additional components could be added to remove this limitation.

Any of cables 12, 14, 16, or 18 which are not connected to a battery are held near V− through resistors 92, 94, 96 and 98, respectively. Connection to a positive battery terminal raises the voltage potential of the corresponding conductor. If this voltage is equal to or greater than one-half of the difference between V+ and V−, it is read as a logic "1" by a four-input binary decoder 100; otherwise, it is read as a logic "0". A battery capable of taking a charge, no matter how weak it may have become, will normally shown this much residual voltage at low loading; a defective battery, or one which has become short-circuited, will not.

For purposes of the following discussion, binary decoder 100 is assumed to be an MC14514, a common CMOS type. A CMOS decoder creates the needed reference voltages internally. However, it will be apparent to those skilled in the art that other device types having similar characteristics are equivalent and may be substituted. If a non-CMOS device is used, additional devices such as voltage comparators will be needed to give the necessary input characteristics.

Large-valued resistors 102, 104, 106 and 108 protect the inputs of decoder 100 against inadvertent damage. Only when appropriate sets of logic "1's" and "0's" are sensed by decoder 100 will connection be made between corresponding pairs of the conductors, and hence between batteries 50 and 60.

Table 1 shows all the possible binary decoder input combinations. Only those which correspond to valid connections —1010, 0110, 1001, 0101 — are accepted; even these may be disabled by enabling the "INHIBIT" line of decoder 100. Selection of a valid combination raises the corresponding "Q" output line —5, 6, 9, or 10 — to a logic "1".

TABLE 1

| POSSIBLE SETS OF BINARY DECODER INPUT | | | | | | |
|---|---|---|---|---|---|---|
| CAB. 12 | 14 | 16 | 18 | INH. | Q | REMARKS |
| 0 | 0 | 0 | 0 | 0 | 0 | Impossible |
| 1 | 0 | 0 | 0 | 0 | 1 | Battery 60 absent or shorted |
| 0 | 1 | 0 | 0 | 0 | 2 | Battery 60 absent or shorted |
| 1 | 1 | 0 | 0 | 0 | 3 | Improper Connection |
| 0 | 0 | 1 | 0 | 0 | 4 | Battery 50 absent or shorted |
| 1 | 0 | 1 | 0 | 0 | 5 | Connect 12-16, 14-18 |
| 0 | 1 | 1 | 0 | 0 | 6 | Connect 12-18, 14-16 |
| 1 | 1 | 1 | 0 | 0 | 7 | Improper Connection |
| 0 | 0 | 0 | 1 | 0 | 8 | Battery 50 absent or shorted |
| 1 | 0 | 0 | 1 | 0 | 9 | Connect 12-18, 14-16 |
| 0 | 1 | 0 | 1 | 0 | 10 | Connect 12-16, 14-18 |
| 1 | 1 | 0 | 1 | 0 | 11 | Improper Connection |
| 0 | 0 | 1 | 1 | 0 | 12 | Improper Connection |
| 1 | 0 | 1 | 1 | 0 | 13 | Improper Connection |
| 0 | 1 | 1 | 1 | 0 | 14 | Improper Connection |
| 1 | 1 | 1 | 1 | 0 | 15 | Impossible |
| x | x | x | x | 1 | None | Manual Override |

When a logic "1" appears at Q5, Q6, Q9 or Q10, one of two NOR gates 110, 112 is activated and generates a logic "0" at its output; one of these, gate 110, is activated by either Q5 or Q10, the other, gate 112, by either Q6 or Q9. The outputs of gates 110, 112 enter RC circuits 120, 122, respectively. If the logic "1" input to gates 110, 112, persists uninterrupted for a period set by RC circuits 120, 122 that are connected to the outputs of gates 110, 112 — preferably for about one second — then the input to one of two inverting gates 130, 132, is brought to a logic "0" through the RC circuits, and outputs of gates 130, 132 switch to a logic "1". Any interruption during that period, however, causes charge to be transferred quickly through a diode 144, 146 connected to the network and prevents the logic "0" from appearing at the input to gates 130, 132; this reduces the likelihood of sparking during the initial connection of cables to batteries. Either of the inverting gates, 130, 132, switching to logic "1", activates a corresponding relay device (or pair of such devices) 140, 142 which connects together the external conductors in either of two ways — 12-16 and 14-18 for relay device 140 or 12-18 and 14-16 for relay device 142 — as required for proper charging.

An optional signalling device, preferably a green lamp or LED 148, may also be activated to show that charging is taking place.

Immediate manual override of charging, through deactivation of the relay devices, may be accomplished through the optional override switch 150 connected to the "INHIBIT" line of the decoder; this could be used, for example, to prevent sparking upon the removal of the cables from the batteries. Alternatively, a latching circuit as is well known in the art could perform this function; such a latch would be set automatically on power-up (enabling charging) and reset when the user pressed a pushbutton, preferably labeled "DISCONNECT".

FIG. 3a shows a generalized "ladder-logic" symbol for a relay device 160, as used in FIG. 2 to indicate relay devices 140, 142. FIGS. 3b and 3c show alternative relay devices for use with the present invention. A relay device employed in the present invention may be a conventional electro-mechanical relay 164 as shown in FIG. 3c with a coil 166 and a mechanical switch 168 that responds to the magnetic field of coil 166 when an electric current flows therethrough. However, alternatively and preferably, a relay device 170, as seen in FIG. 3b will comprise a MOSFET 172 combined with a series array of photodiodes 174. Array 174 responds to a LED 176 or other source of light by producing a potential that causes MOSFET 172 to conduct. MOSFET-based relay device 170 of FIG. 3b has all the advantages of electro-mechanical relay 164 without the disadvantages.

In use, jumper cable set 10 is simply laid out between the batteries 50 and 60 to be connected together for charging or jump-starting, with cables 12, 14 going to battery 50 and cables 16, 18 going to battery 60. Connection is made between cables to the terminals of the corresponding battery, with no regard which conductor goes to which terminal. Approximately one second after cables 12, 14, 16 and 18 are connected to batteries 50, 60, and provided that the weaker battery shows a low-load voltage at least half that of the stronger battery, the circuitry internal to module 20 closes either relay device 140 or 142 so as to connect the two positive terminals together and the two negative terminals together. Charging then begins, and may be indicated by the optional "CHARGING" indicator such as LED 28. Upon completion of charging, connection may first be broken by moving the optional switch 30 to "OFF" position (or pressing an optional "DISCONNECT" button). Cables 12, 14, 16 and 18 may then be removed safely, without the possiblity of sparking.

It will be apparent to those skilled in the art that many changes and additions can be made to the preferred embodiment described above without departing from the spirit and scope of the invention which is to be defined by the appended claims.

What is claimed is:

1. A device for use in connecting in parallel a first battery having two terminals to a second battery having two terminals, said device comprising:
    conductor means for enabling current to flow to and from each of said four terminals;
    means for comparing each of the voltages of said four terminals to a reference voltage, said voltages sampled from said conductor means, to determine which of said four terminals have voltages higher and which of said four terminals have voltages lower than said reference voltage, said comparing means generating a high signal for each of said four terminals having a higher voltage and generating a low signal for each terminals having a lower voltage, said high and low signals generated by said comparing means forming a set of signals;
    means for connecting either terminal of said first battery to either terminal of said second battery, said connecting means responsive to said high and low signals from said comparing means, said connecting means connecting one terminal of said first battery for which said comparing means has generated said high signal to one terminal of said second battery for which said comparing means has generated said high signal and the remaining terminal of said first battery for which said comparing means has generated said low signal to the remaining terminal of said second battery for which said comparing means has generated said low signal from so that said first battery and said second battery are connected in parallel; and
    two bridge rectifiers for selecting said reference voltage from said voltages of said four terminals so that said reference voltage is higher than the lowest voltage of said four terminals and lower than the highest voltage of said four terminals.

2. The device as recited in claim 1, wherein each of said bridge rectifiers selects a low voltage and a high voltage, said low voltages of said two rectifiers being interconnected to produce an interconnected low voltage and said high voltages of said two rectifiers being interconnected to produce an interconnected high voltage, said interconnected high voltage being combined with said interconnected low voltage to produce a reference voltage approximately halfway between said interconnected high and low voltages.

3. A method for connecting in parallel a first battery to a second battery, each of said first and second batteries having two terminals, said method comprising the steps of:
    generating a reference voltage;
    comparing the voltage of each of said terminals of said first and second batteries to said reference voltage;
    generating a first signal for each terminal having a voltage higher than said reference signal;
    generating a second signal for each terminal having a voltage lower than said reference signal;
    establishing a digital memory address for each combination of first and second signals, said digital memory address having an output for each combination of first and second signals wherein only one signal from said first battery is high and only one signal from said second battery is high;
    routing said first and second signals to the correct memory address; and
    connecting, in response to said output of said memory address, the terminal having said first signal of said first battery to the terminal having said first signal of said second battery and the terminal having said second signal of said first battery to the terminal having said second signal of said second battery on receipt of said output from said memory address.

4. The method as recited in claim 3, wherein said reference voltage is selected to be approximately halfway between the highest and lowest voltage of said terminals.

* * * * *